(12) United States Patent
Tabenkin et al.

(10) Patent No.: US 9,582,510 B2
(45) Date of Patent: Feb. 28, 2017

(54) LIVE UPGRADE

(71) Applicant: Dassault Systemes Americas Corp., Waltham, MA (US)

(72) Inventors: Boris Tabenkin, Georgetown, MA (US); David Edward Tewksbary, Bolton, MA (US); William Joseph Upham, Nashua, NH (US); Severin Lanfranchi, Winchester, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 343 days.

(21) Appl. No.: 13/905,719

(22) Filed: May 30, 2013

(65) Prior Publication Data

US 2014/0358854 A1    Dec. 4, 2014

(51) Int. Cl.
*G06F 17/00* (2006.01)
*G06F 17/30* (2006.01)
*G06F 9/44* (2006.01)

(52) U.S. Cl.
CPC .......... *G06F 17/30079* (2013.01); *G06F 8/68* (2013.01); *G06F 17/30578* (2013.01)

(58) Field of Classification Search
CPC .... G06F 3/067; G06F 15/173; G06F 11/1417; G06F 11/201; G06F 9/468; G06F 2009/4557
See application file for complete search history.

(56) References Cited

U.S. PATENT DOCUMENTS

| 7,310,653 | B2 | 12/2007 | Coyle et al. | |
|---|---|---|---|---|
| 8,898,201 | B1 * | 11/2014 | Drost | G06F 17/30079 707/803 |
| 8,984,243 | B1 * | 3/2015 | Chen et al. | 711/162 |
| 9,275,368 | B1 * | 3/2016 | Harpalani | G06F 17/241 |
| 2004/0225658 | A1 * | 11/2004 | Horber | 707/9 |

(Continued)

FOREIGN PATENT DOCUMENTS

EP    2 418 591 A1    2/2012

OTHER PUBLICATIONS

Extended European Search Report, Application No. 14166366.6, "Live Upgrade", dated Sep. 3, 2014.

*Primary Examiner* — Mariela Reyes
*Assistant Examiner* — Courtney Harmon
(74) *Attorney, Agent, or Firm* — Hamilton, Brook, Smith & Reynolds P.C.

(57) ABSTRACT

A method and corresponding system upgrades a live computer system. The method begins with migrating a copy of data from a first system to a communicatively coupled second system at a first time. Next, at one or more subsequent times, a copy of changed data is migrated from the first system to the second system until a threshold is reached. Finally, in response to reaching the threshold, a copy of the remaining changed data is migrated from the first system to the second system. A further embodiment of the method comprises: disabling access to the first system during the migration of data at the first time, enabling and maintaining access to the first system at the one or more subsequent times during the migration of the copy of changed data, and disabling access to the first system during the migration of the copy of the remaining changed data. In this manner, the system being upgraded is still highly available throughout the upgrade process.

18 Claims, 7 Drawing Sheets

(56) References Cited

U.S. PATENT DOCUMENTS

| | | | |
|---|---|---|---|
| 2005/0267938 A1* | 12/2005 | Czeczulin | G06Q 10/107 709/206 |
| 2010/0088281 A1* | 4/2010 | Driesen | G06F 8/65 707/641 |
| 2011/0271270 A1* | 11/2011 | Bowen | G06F 8/67 717/171 |
| 2011/0289047 A1 | 11/2011 | Ahuja | |
| 2011/0320556 A1* | 12/2011 | Reuther | 709/213 |
| 2012/0101983 A1 | 4/2012 | Hopmann et al. | |
| 2013/0054530 A1* | 2/2013 | Baker | G06F 17/30079 707/639 |
| 2014/0149591 A1* | 5/2014 | Bhattacharya et al. | 709/226 |

* cited by examiner

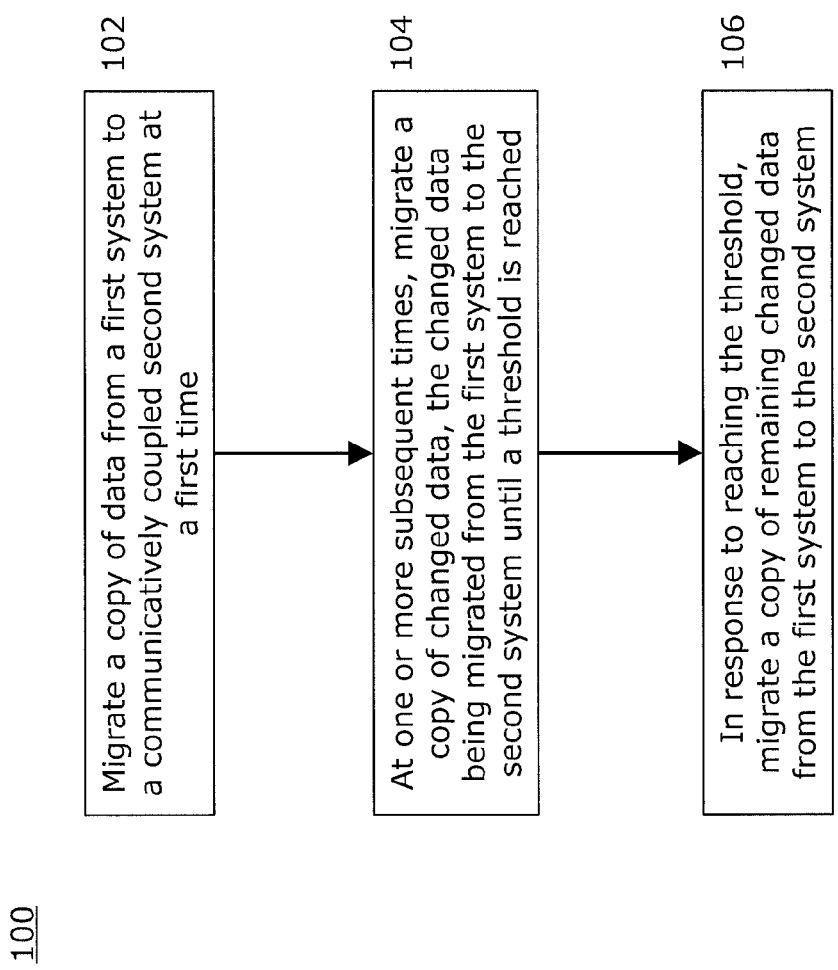

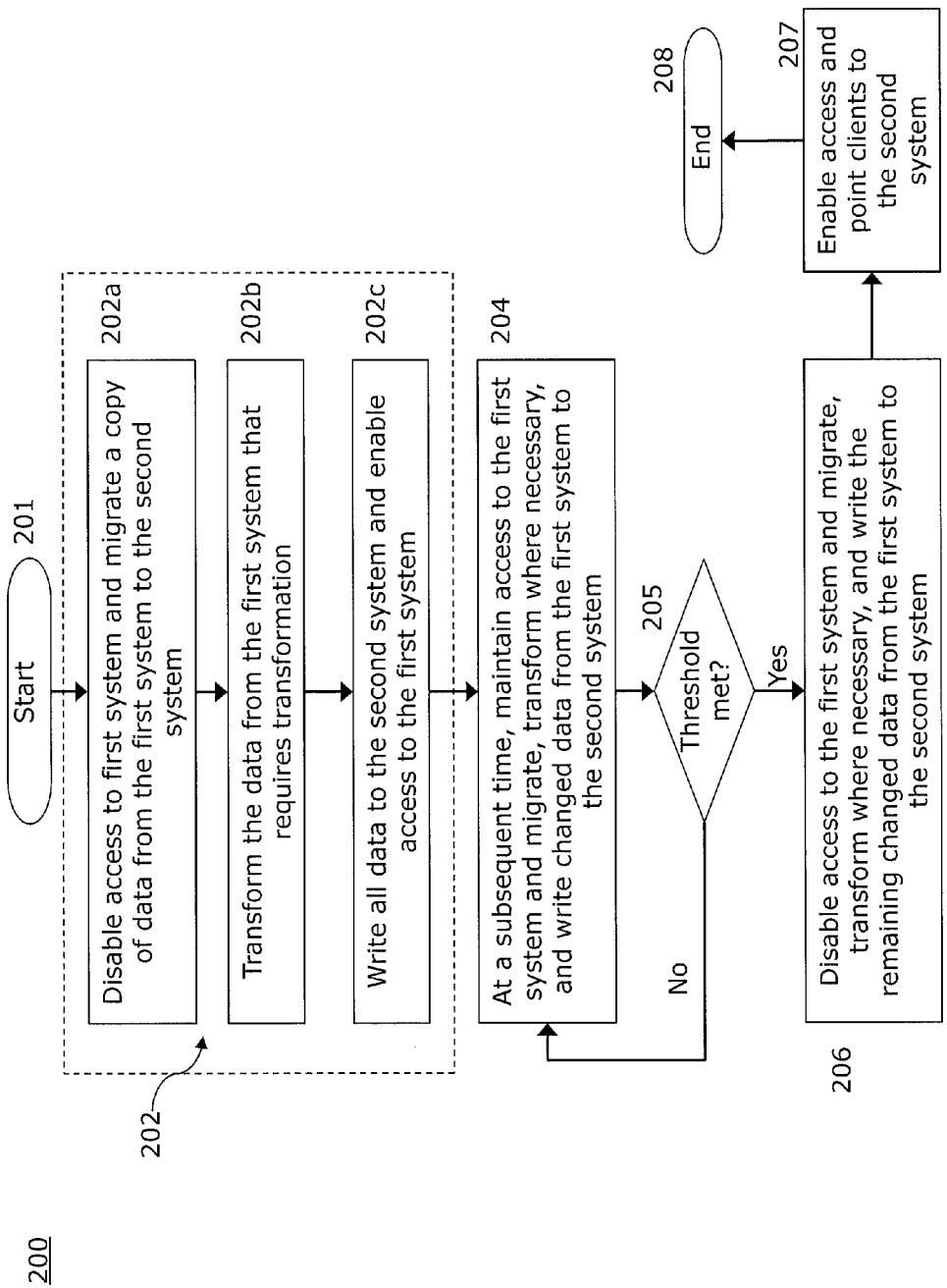
Figure: 2

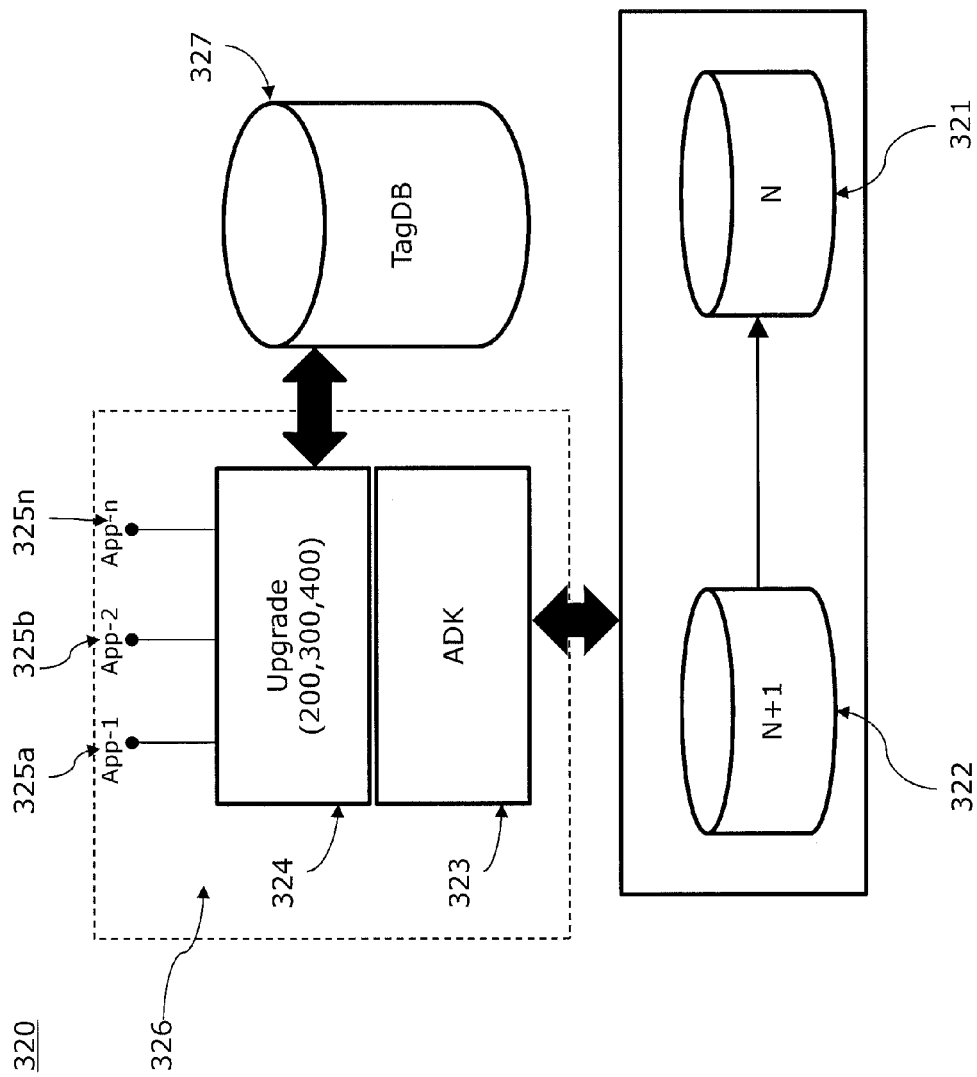
Figure: 3

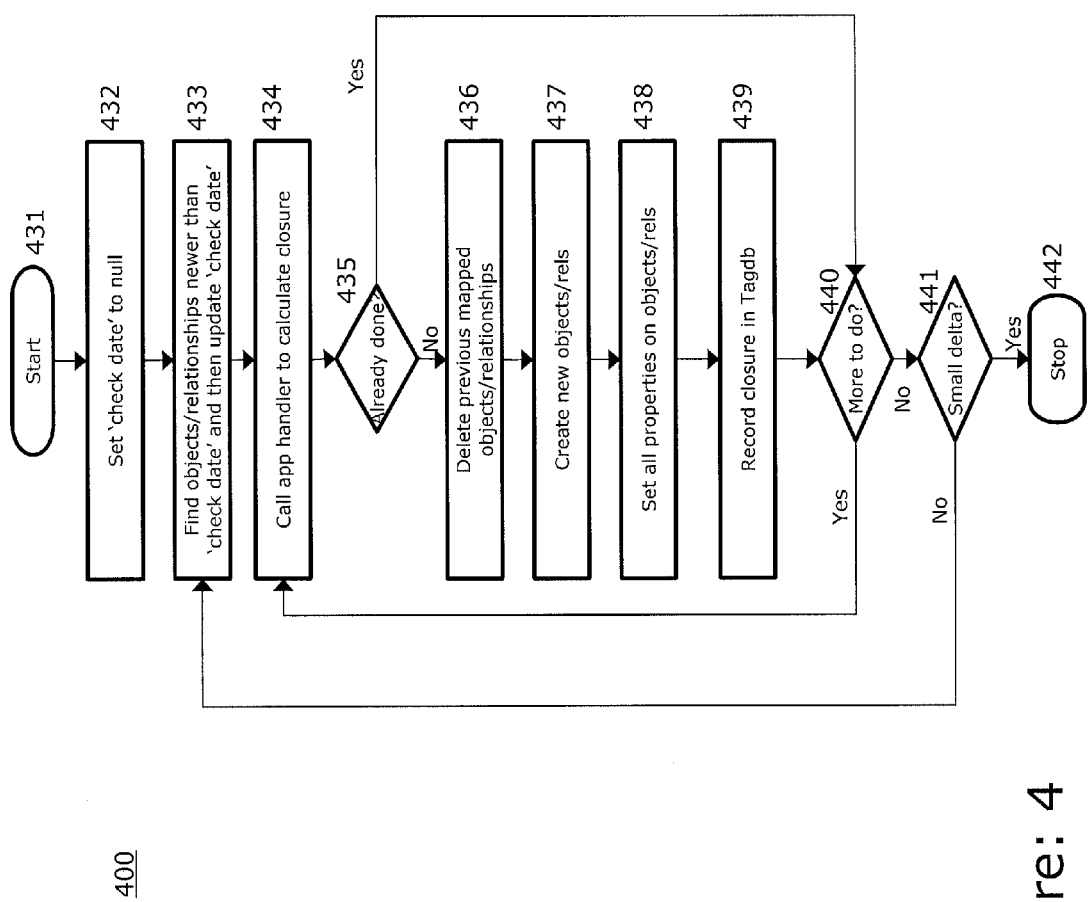
Figure: 4

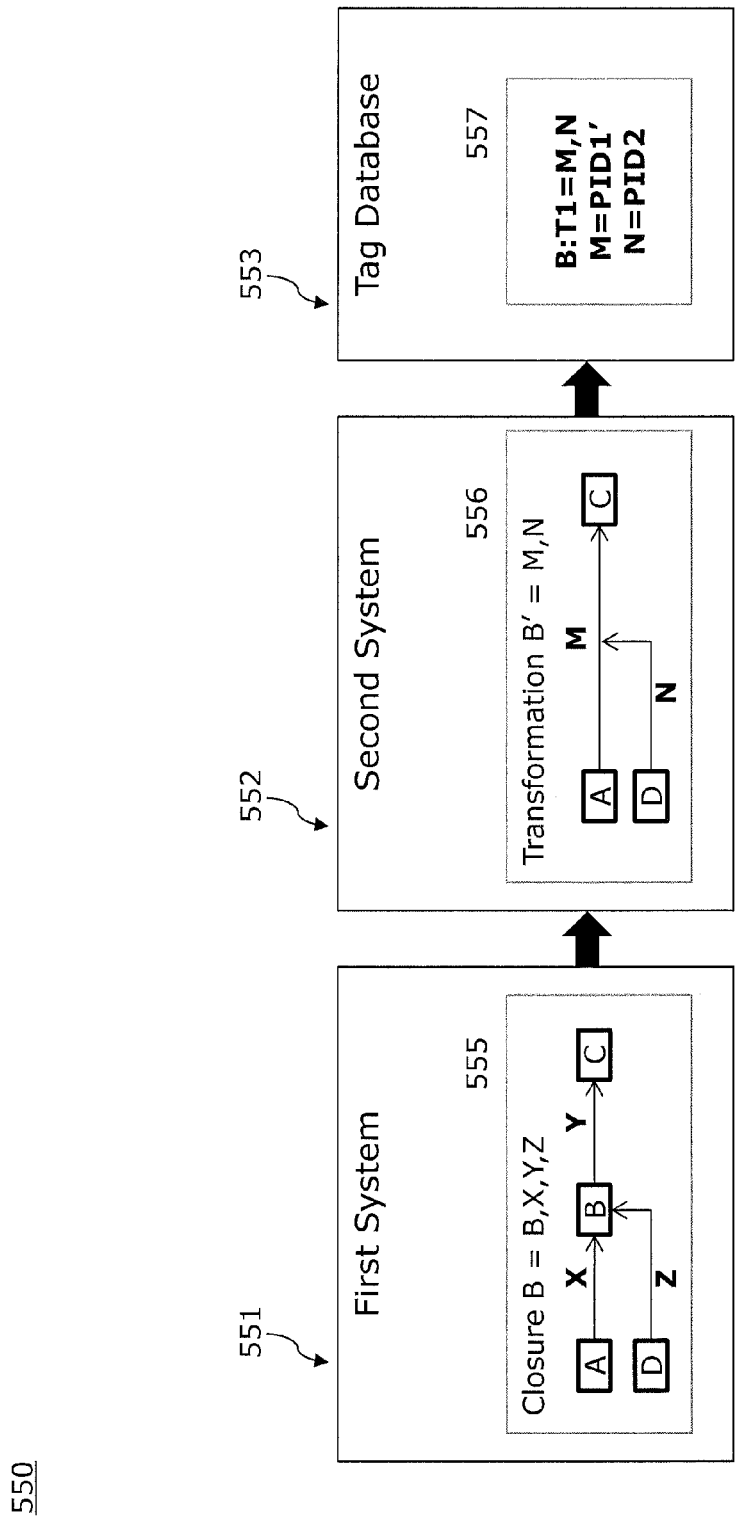
Figure: 5

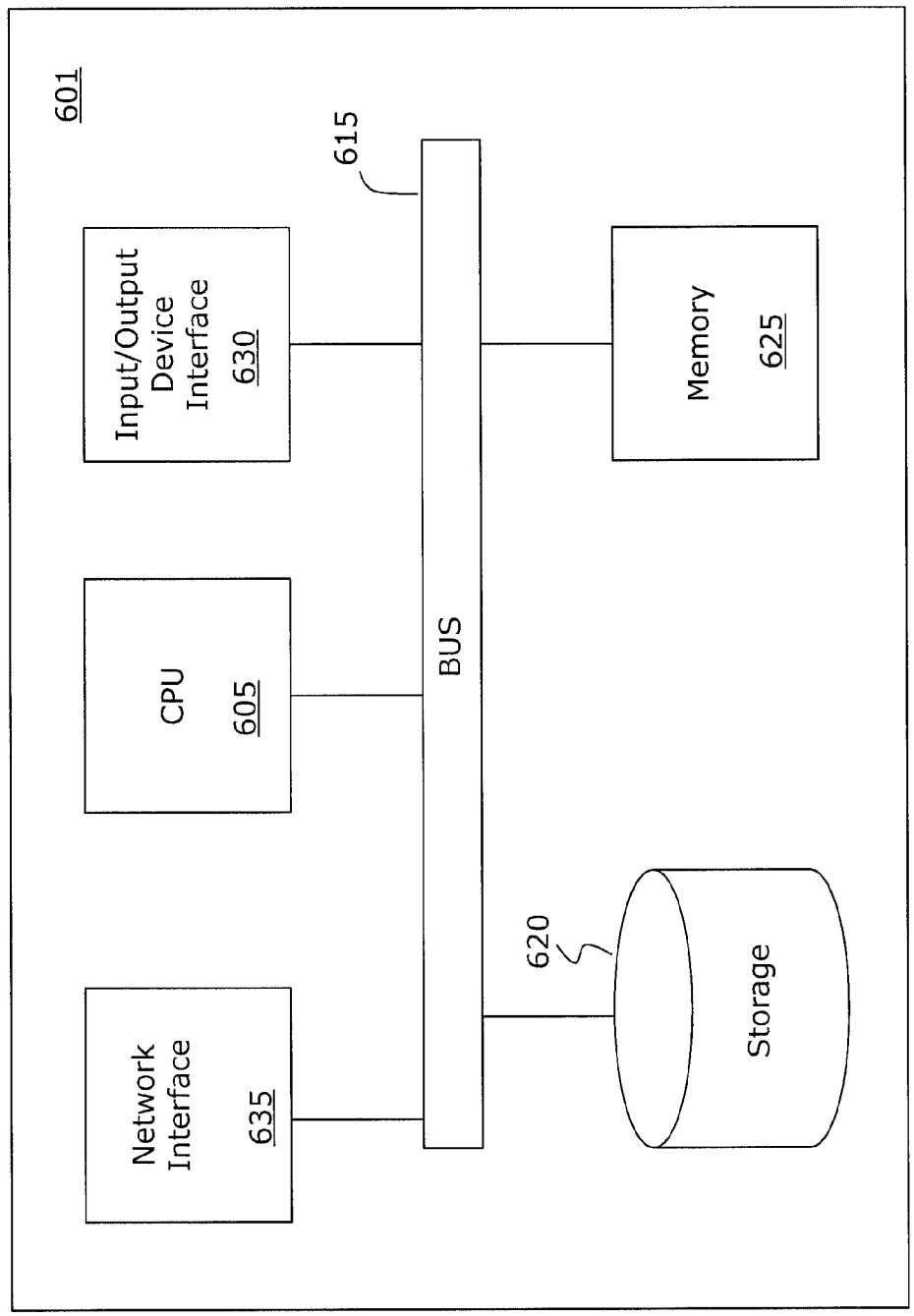
Figure: 6

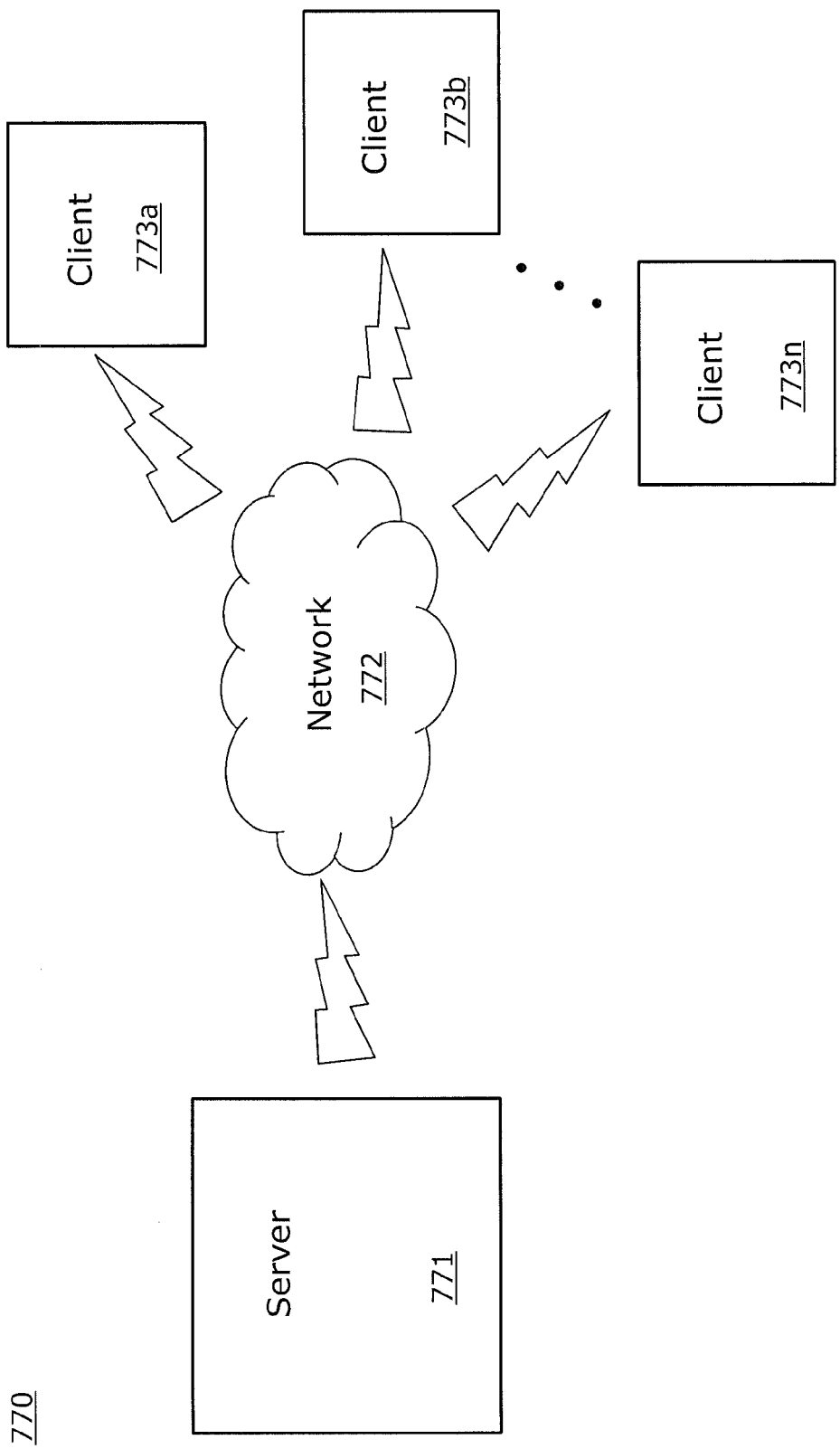
Figure: 7

LIVE UPGRADE

BACKGROUND OF THE INVENTION

The invention generally relates to the field of computer programs and systems, and specifically to the field of performing system upgrades.

The advent of computer programs and systems has greatly changed the manner in which business is conducted. Many sophisticated and complex computer systems have been developed to assist businesses and consumers. These systems however do not remain stagnant, and such systems typically require upgrades.

SUMMARY OF THE INVENTION

A method and corresponding system, according to an embodiment of the present invention are directed to upgrading a computer system. An embodiment of the invention begins by migrating a copy of data from a first computing (data processing) system to a communicatively coupled second computing (data processing) system at a first time. After this initial migration, a copy of changed data is migrated from the first system to the second system at one or more subsequent times until a threshold is reached. In response to reaching the threshold, a copy of the remaining changed data is migrated from the first system to the second system.

An embodiment of the invention may further comprise writing a subset of the migrated data to the second system in an untransformed manner. In other words, the data is written in a manner that is free of requiring transformation. Yet another embodiment of the invention comprises installing one or more applications in a manner allowing for communication with the second system. Such an embodiment may further comprise transforming a subset of the migrated data using one or more respective handlers supplied by the one or more installed applications and writing the transformed data to the second system. According to an alternative embodiment of the invention, the handlers may use a database to track the data transformation.

In an embodiment of the invention, access to the first system is disabled during the migration of the copy of data at the first time. Further, in such an embodiment, access to the first system is enabled and maintained at the one or more subsequent times when the copy of the changed data is being migrated from the first system to the second system. Yet further still, access to the first system may be disabled during the migration of the copy of the remaining changed data from the first system to the second system.

According to an embodiment of the invention, the first system and the second system may be communicatively coupled unidirectionally, such that the first system has no visibility into the second system. An embodiment of the invention may further comprise pointing one or more clients to the second system after migrating the copy of the remaining changed data from the first to the second system in response to reaching the threshold. In yet another embodiment of the invention, the first system is deleted after the copy of the remaining changed data is migrated from the first system to the second system. Further still, an embodiment of the invention may comprise performing kernel upgrades of the second system.

According to an embodiment of the invention the changed data is data that has been altered and data that has been added to the first system since a prior time data was migrated from the first system to the second system. In a further embodiment of the present invention, the threshold is an amount of changed data on the first system.

A further embodiment of the invention is directed to an upgrading system. The system may comprise: a first system, a second system communicatively coupled to the first system, and a processor. In such an embodiment, the processor may be configured to migrate a copy of data from the first system to the second system at a first time. The processor may be further configured to migrate a copy of changed data at one or more subsequent times. This migration may proceed until a threshold is reached. In response the reaching the threshold, the processor may be configured to migrate a copy of the remaining changed data from the first system to the second system.

In further embodiments of the system, the processor is configured to write a subset of the migrated data in an untransformed manner. According to another embodiment of the upgrading system, the processor is configured to install one or more applications in a manner allowing for communication with the second system. In yet another embodiment, the processor is configured to transform a subset of the migrated data using one or more respective handlers supplied by the one or more installed applications. In a further embodiment, the processor is further configured to write the transformed data to the second system.

In yet another embodiment of the upgrading system, the processor is configured to disable access to the first system while migrating the copy of the data from the first system to the second system at the first time. The processor may also be configured to enable and maintain access to the first system at the one or more subsequent times when a copy of changed data is being migrated. Yet further still, according to an embodiment of the invention, the processor may be configured to disable access to the first system when the copy of the remaining changed data is being migrated from the first system to the second system.

According to an embodiment of the upgrading system, the changed data is data that has been altered and data that has been added to the first system since a prior time data was migrated from the first system to the second system. In an alternative embodiment of the present invention, the processor is configured to point one or more clients to the second system, and delete the first system, after the copy of the remaining changed data is migrated from the first system to the second system.

Yet another embodiment of the present invention is directed to a cloud computing implementation for upgrading a system. Such an embodiment is directed to a computer program product executed by a server in communication across a network with one or more clients. The computer program product comprises a computer readable medium which comprises program instructions which, when executed by a processor causes migrating a copy of data from a first system to a communicatively coupled second system at a first time, at one or more subsequent times, migrating a copy of changed data, the changed data being migrated from the first system to the second system until a threshold is reached, and in response to reaching the threshold, migrating a copy of remaining changed data from the first system to the second system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a flow chart depicting a method of upgrading a system according to the principles of the present invention.

FIG. 2 is a flow chart depicting a method of upgrading a system.

FIG. 3 is a simplified diagram of an upgrading system according to an embodiment of the invention.

FIG. 4 is a flow chart depicting a method for upgrading a system according to principles of the invention.

FIG. 5 is a simplified diagram illustrating the process of transforming data according to an embodiment of the invention.

FIG. 6 is a block diagram of a computer system that may be used in an embodiment of the invention.

FIG. 7 is a simplified diagram of a computer system in which an embodiment of the present invention may be embodied.

DETAILED DESCRIPTION OF THE INVENTION

Enterprise computer/software systems typically require upgrades to include such things as further product features. However, performing upgrades may require system downtime and thus prevent consumer use of the system. Further, system downtime may discourage users from upgrading systems. Thus, an embodiment of the invention addresses the need to upgrade an existing enterprise software system and minimize the overall downtime of the system. Among other reasons, it is important to minimize the downtime caused by system upgrades in order to satisfy customer expectations as well as Service Level Agreements (SLAs).

While upgrade times may vary, they are often correlated to the amount of data that is stored in the system. Thus, as the use of systems increases and such systems store more data, the downtime that upgrades require will likely increase.

An embodiment of the invention alleviates the downtime caused by upgrading these systems. While the term "data" is used throughout this application, "data" may refer to an object which is simply a defined unit of data. Further, "data" as referred to throughout the application may refer to the structure of an object. For example, data may comprise the various attributes that a given object may store. The structure of data (objects) may be referred to generically as metadata, i.e. data about data. In enterprise systems there may be a large variety of data structures and oftentimes upgrading a system may involve changing these data structures or adding entirely new data structures. Further complicating system upgrades is the fact that such changes may be done on a client by client basis, which may result in requiring customized upgrading processes for each client.

An embodiment of the invention solves the problem of upgrading metadata systems. In complex metadata systems, the relationship of data to each other is governed by highly complex structures that may change from release to release. The data structure complexity is dictated by the need to model complex physical and logical data. These structure changes are frequently due to evolving modeling requirements and performance considerations. An embodiment of the invention allows for upgrading these structures while minimizing system downtime.

A description of example embodiments of the invention follows.

FIG. 1 is a flow diagram of a method 100 for upgrading a computer-based system. The method 100 begins with migrating a copy of data from a first system to a communicatively coupled second system at a first time (102). The first system and the second system may be any computing or computer-based system known in the art such as an enterprise software system. The data may be copied from the first system using any method as is known in the art, such as using a "snap" utility provided by a file system associated with an operating system that is run by a processor configured to run the upgrade. The first system and second system may be communicatively coupled in any variety of ways such as via a local area network (LAN) or wide area network (WAN) connection utilizing a hypertext transfer protocol (HTTP) or secure HTTP (HTTPS) protocol.

After migrating a copy of data at a first time, at one or more subsequent times, a copy of changed data is migrated from the first system to the second system until a threshold is reached (104). For example, according to an embodiment of the method 100, after the initial copy and migration of data, the method continues to migrate data to the second system that is changing or being added to the first system. Because this process may occur over an extended period of time, there may be multiple occurrences of migrating changed data. As stated, the process of migrating changed data proceeds until a threshold is reached.

In an embodiment of the invention the threshold refers to the amount of changed data on the first system. This threshold may be set based on any number of factors, including the historical amount of changed data. Further, the threshold may also refer to the elapsed time of the upgrade process and/or the time of day when the process is occurring. For example, if the system must be upgraded by a certain time, the process may continue until a time is reached where it is necessary to finalize the upgrade. Further, it may be advantageous to define the threshold in terms of off-peak versus peak hours. To illustrate, changes to data in the first system are likely the result of users, one may assume that there are few users utilizing the first system during off-peak hours, and thus the threshold may be reached at these off-peak times. Further still, the threshold may be defined as a combination of the described factors and/or any other considerations as are known in the art.

In response to reaching the threshold, the next step of the method 100 is to migrate a copy of the remaining changed data from the first system to the second system (106). After migrating the remaining changed data (106), all of the data from the first system should be migrated to the second system.

FIG. 2 is a flow chart depicting a method 200 of upgrading a system. The method 200 illustrates details of an embodiment of the method 100 for upgrading a live system. The method 200 starts 201 with the series of steps 202. These steps 202 may embody step 102 of method 100 as described hereinabove in relation to FIG. 1. While the method 200 upgrades a system in a manner that minimizes downtime, an embodiment of the method 200 does cause some downtime to the system being upgraded.

The method 200 begins by disabling access to the first system and migrating a copy of data from the first system to the second system (202a). While migrating the copy of data, one or more subsets of this data may be transformed (202b). In an embodiment of the invention, only data that requires transformation will be transformed, while other data may be migrated without being transformed. After transforming the data (202b), the transformed data and the non-transformed data is written to the second system (202c). The details and process of transformation is described hereinbelow in relation to FIG. 5. At this time, access is enabled to the first system (202c). The sub-process 202 of the method 200, limits downtime of the first system to the initial copy of the data on the first system. After the initial copy, access to the first system is enabled. Therefore, while performing the system upgrade, the user experience is that of a highly available system.

After migrating, transforming, and writing the data from the first system to the second system (202), the next step of the method 200 is to migrate a copy of changed data from the first system to the second system, transform a subset of this data if necessary, and write the changed data to the second system (204). The step 204 occurs at a time subsequent to step 202. As described above, because access to the first system is enabled after the initial migration of data at step 202c, new data is likely being added to the first system, and data existing on the first system is likely being altered. These changes to the data on the first system must be reflected in the second system. Hence, the step 204 where, at a subsequent time the changed data is copied, migrated, transformed where necessary, and written to the second system.

After copying, migrating, transforming, and writing the changed data to the second system (204), the next step in the method 200 is to determine if the threshold is met (205). The threshold is a point where it is determined that the process 200 should finish the upgrade. The threshold may be defined in any manner as is known in the art. In an example embodiment of the method 200, the threshold is the amount of changed data on the first system. If after checking the threshold (205) it is determined that the threshold is not met, the method 200 returns to step 204, where changed data on the first system is copied, migrated, transformed, and written to the second system. This loop of copying, migrating, transforming, and writing (204), and checking the threshold (205) continues until the threshold is reached.

In response to reaching the threshold, access is disabled to the first system and the remaining changed data is migrated, transformed, and written from the first system to the second system (206). At this point, the second system comprises the up to date data that was on the first system. After migrating the remaining changed data (206), access is enabled and clients are pointed to the second system (207) and the method 200 ends (208).

In this manner, the method 200 upgrades the first system by creating and upgrading a mirror of the first system using an iterative process as described. The method 200 provides a manner in which a system can be upgraded with limited down time. As described, according to an embodiment of the method 200, access to the first system is only disabled during the initial migration 202, and the final pass to migrate the remaining changed data (206).

FIG. 3 is a simplified diagram of an upgrading system 320 according to an embodiment of the invention. The upgrading system comprises a processor 326. The processor 326 is configured to perform system upgrades utilizing the various components of the upgrading system 320. The system 320 further comprises an application and development toolkit (ADK) 323. The ADK 323 may be embodied in hardware, software, and/or a combination thereof and may function as an application programming interface (API) into the system 320. In an embodiment of the invention, the ADK 323 is executed by the processor 326. According to an embodiment of the invention, the ADK 323 is delivered in asset library files, the files being in any format as is known in the art, for example a Java ARchive (JAR) format. According to an embodiment of the system 320, the ADK 323 allows users and administrators to interact with the system 320. As will be explained in further detail below, the ADK 324 can be used by handlers supplied by the system 320 and/or the various applications 325a-n, coupled to the system 320, and executed by the processor 326 to perform queries against the system to be upgraded 321. These queries may be inquiries related to data that has changed on the system to be upgraded 321 (the N system).

Further coupled to the processor 326, are applications 325a-n. Any number of applications 325a-n may be coupled to the processor 326. The applications 325a-n may be executed by the processor 326 and made available to users. Example applications include Computer Aided Design (CAD) applications, Computer Aided Engineering (CAE) applications, and/or other application modeling tools. In an embodiment of the invention, the applications 325a-n provide various handlers. As will be described in detail hereinbelow, the various handlers may be executed by the processor 326, and configured to transform data from the system to be upgraded 321.

Coupled to the processor 326, the applications 325a-n, and the ADK 323 is the upgrade module 324. The upgrade module 324 may be embodied by hardware, software, and/or a combination thereof. The upgrade module 324 may be executed in whole or in part by the processor 326. In an embodiment of the invention, the upgrade module 324 is configured to change the administrative definitions that define the data models (schema) that govern the various applications 325a-n. These administrative definitions refer to the definition of data structures of the various schema of the applications 325a-n. Throughout this application the terms model, schema, and metadata may be used interchangeably to refer to data about data, i.e., data describing the structure of data as used by the various applications 325a-n.

The upgrade module 324 may be configured to embody the methods 200, 300, and/or 400 as described herein. The upgrade module 324 may be configured to perform upgrades at various system levels. For example, the upgrade module 324 may perform kernel upgrades, which may comprise changing database level definitions, i.e., database schema. The upgrade module 324 may also be configured to perform kernel platform level changes, which comprises changing how data is organized. Further, the upgrade module 324 may change application level definitions. Application level changes can be as simple as adding additional data to existing objects, for example, adding an attribute to a type, or they may comprise changing the structure of how the data is organized. As described herein, where the structure of data is changed, handlers supplied by the respective applications 325a-n may be used to transform data from the original N system 321 and present it to the N+1 system 322.

The upgrading system 320 further comprises a database 327, which may be referred to as a TagDB. The database 327 is communicatively coupled to the upgrade module 324 and the processor 326. According to an embodiment of the invention, the database 327 is used by the processor 326, the upgrade module 324, the applications 325a-n, and respective handlers supplied by the applications 325a-n to track the process of transforming data from the system to be upgraded 321. The database 327 may be any database as is known in the art and may be structured in any way as to facilitate the process of upgrading the system to be upgraded 321. For example, in an embodiment of the invention, the database 327 is a "not only structured query language" (NoSQL) type database.

The upgrade system 320 further comprises an original system, i.e., the system to be upgraded 321, which throughout this application may be referred to as the "N system." The system to be upgraded 321 comprises a variety of data used by the applications 325*a-n* that facilitates and/or results from use of the applications 325*a-n* by users. For example, if a given application 325*a* is a CAD application the system 321 may comprise data defining a CAD model generated by a user through use of the application 325*a*. The N system 321 would store this data in a particular structure which is referred to as the metadata of the application 325*a*, which is governed by the particular schema of the application 325*a*.

Communicatively coupled to the system 321 is the system 322 which will be the resulting upgraded system. The systems 321 and 322 are communicatively coupled to the processor 326. The systems 321 and 322 may be accessed through use of various modules, including the upgrade module 324 and the ADK module 323, to perform the system upgrade according to principles of the current invention. Further the systems 321 and 322 may be communicatively coupled unidirectionally, such that the first system 321 has no visibility into the second system 322, or vice versa.

Described hereinbelow is an example use of the system 320 to upgrade the system 321. An example method of upgrading the system 321 utilizing the upgrading system 320 may begin with any number of initial setup procedures. One such procedure may comprise disabling administrative changes on the system to be upgraded 321. Administrative changes may refer to the metadata, i.e., the rules describing the structure of the data stored on the system 321. The ability to make administrative changes may be left off throughout the upgrade process. However, the ability to create "instant data" may still be allowed throughout the upgrade process. "Instant data" may refer to altered and new data, but not data defined by a new data structure, as changes to data structures may be disabled throughout the upgrade process.

Other initial procedures comprise configuring the N+1 system 322 to connect back to the N system 321. This connection may be accomplished in any way as is known in the art including through use of a HTTP (hypertext transfer protocol) and/or a HTTPS (secure HTTPS) protocol. The initial procedure may further comprise copying data from the N system 321 to the N+1 system 322. This data may be copied using any method as is known in the art including using a file system "snap" utility. Another initial procedure that may be part of the method of upgrading the system 321 using the upgrade system 320 may include performing kernel upgrades on the N+1 system 322.

Further, initial procedures may comprise installing applications 325*a-n* with their schema upgrades. These applications 325*a-n*, with schema upgrades, may be installed on a tenant by tenant basis. These schema (metadata) updates refer to changes in the structure of data. For example, in the case of a modeling tool application, a schema change may include adding an attribute or modifying a policy of a particular data structure. The applications 325*a-n* may be installed on any system or component such that the applications 325*a-n* are in installed in a manner allowing for communication with the N+1 system 322. In an example embodiment, the applications are installed on the N+1 system which may have the effect of upgrading metadata definitions in the N+1 system. After installing the applications 325*a-n* with their respective schema upgrades where desired, the initial set up procedure may further comprise configuring application handlers for data types that require transformation. Configuring handlers may be as simple as configuring respective handlers such that when a handler encounters a particular data structure it transforms the data structure in a particular manner so as to comply with the schema upgrades. While handlers may be configured to transform data, other handlers, which may be referred to as default handlers, may be configured to handle data that does not require transformation. This may include identifying data that does not require transformation, facilitating the transfer and update of data that does not require transformation, and writing this data to the N+1 system 322. Another initial procedure may comprise configuring the database 327 for use by the upgrade module 324 and the respective handlers supplied by the applications 325*a-n*.

After one or more of the initial set-up procedures, the upgrade may be performed. As described above, the initial process includes copying the data on the N system 321 and migrating this data to the N+1 system 322. After the initial copy, the upgrade module 324 and the ADK 323 which may be executed by the processor 326 work in conjunction to perform the upgrade of the N system 321. In this manner, as data is being added to, and altered on, the N system 321, these data changes are being reflected on the N+1 system 322 through use of the upgrade module 324, ADK 323, applications 325*a-n*, handlers, and processor 326.

In an example embodiment of the upgrade process, in the first iteration of the upgrade, an initial transformation of all closures is captured. A closure refers to a set of objects related to one another, in this manner, a closure refers to the scope of the objects. Throughout this application, the terms data and objects may be used interchangeably.

In this first iteration all data needing transformation is processed. This involves a query by the ADK 323 to the N system 321 to determine all data that requires transformation. While such data is already on the N+1 system because of the original copy and migration done as an initial procedure, rather than access this data on the N+1 system 322 to transform the data that requires transformation, the handlers supplied by the respective applications 325*a-n* instead delete this non-transformed data on the N+1 system 322, and access the data that requires transformation on the N system 321. Then this data requiring transformation is migrated, transformed, and then written to the N+1 system 322.

After, the first iteration of the upgrade process, the upgrade method via the ADK 323 queries the N system 321 to determine any data that has changed since the last time the system was queried. From this point only data that has changed on the N system 321 is migrated, transformed where necessary, and written to the N+1 system 322. Further, any transformed data that requires updating that is stored on the N+1 system 322 is deleted. The corresponding data on the N system 321 is migrated, transformed, and written to the N+1 system 322. This may be advantageous as it may be faster to transform, migrate, and write data that requires transformation rather than update transformed data that requires updating on the N+1 system 322. In an alternative embodiment, rather then deleting the transformed data that requires updating on the N+1 system 322, the data on the N+1 system 322 is simply upgraded.

This iterative process of accessing the N system 321 and updating the data on the N+1 system 322 to reflect changes made to the data on the N system 321 continues until a threshold is reached. This threshold may refer to the amount of differences between the data on the N system 321 and the N+1 system 322, i.e., the size of the delta. Further, the threshold may alternatively be a time deadline and/or a combination of delta and time. After reaching a threshold, all of the remaining changed data on the N system 321 is migrated, transformed where necessary, and written to the N+1 system 322, and the process is complete.

In a further embodiment of the system 320, the processor 326 is configured to disable access to the N system 321 during the initial copy and initial data migration. Further, the processor 326 may be configured to enable and maintain access to the N system 321 after the initial migrate and copy and during the iterative process of migrating, transforming, and writing data to the N+1 system 322 to reflect changes to the data on the N system 321. Yet further still, the processor 326 may be configured to disable access to the N system 321 during the migration of the remaining changed data that occurs in response to reaching the threshold.

According to an alternative embodiment of the invention, the processor 326 may be further configured to point clients to the N+1 system 322 after the upgrade is complete. An alternative embodiment may further comprise deleting the N system 321 after the upgrade is completed.

Further, in an embodiment of the invention, the system 321 may be shared by any number of tenants. Accordingly, the upgrade of the N system 321 may be done on a tenant by tenant basis. Further, such an upgrade procedure may comprise installing applications on a tenant by tenant basis such that each application may conform to the needs of respective tenants.

FIG. 4 is a flow chart depicting a method 400 for upgrading a system according to principles of the present invention. The method 400 starts (431) and a "check date" is set to null (432). The "check date" refers to the last time the system to be upgraded was queried by the updating process. As described herein the embodiments of the method 400 may further comprise performing any number of initial procedures including installing applications with schema upgrades. After initializing the "check date" (432), objects and relationships are identified that are newer than "check date" (433). While the term newer is used, newer may refer to objects that have been altered since "check date" but that are not necessarily "new." Further, after determining the objects/relationships that are newer than "check date," "check date" is set to the time of this inquiry (433). Next, a handler from a respective application, such as the application 325a, described in relation to FIG. 3, is called to calculate a closure. As described hereinabove, the closure refers to sets of objects that are related to one another. A closure, as described herein, comprises objects and relationships between these objects, as illustrated and described herein in relation to FIG. 5. Calculating the closure refers to the process of transforming the objects and thus the related objects to conform with the schema upgrades resulting from the system upgrades. After calling an application handler to calculate a closure (434), it is determined if the closure has been calculated (435). Where the closure has already been calculated the process determines if there is more to do (440). When in it is determined that the closure has not already been calculated (435), first, previously mapped objects and relationships are deleted (436). Next, new objects and relationships are created (437). After the new objects and relationships are created (437), then all the properties regarding the objects and relationships are set (438). After setting the properties of the objects and relationships (438), the closure is recorded in a database, such as the database 327 of FIG. 3 (439).

The next step in the process 400 is to determine if there is more to do (440). This inquiry asks whether there are more objects that require transformation. If there are more objects that require transformation the method 400 returns to step 434 and calls an application handler to calculate another closure and the steps 435-439 are repeated for the closure that requires transformation. This process continues until all the objects and relationships that have been identified as newer than "check date" in step 433 have been properly transformed and/or migrated to the new system. When it is determined that there are no more objects that need to be transformed and/or migrated it is determined at step 440 there is not more to do.

Upon making the determination that there is no more to do (440), the next step of the method 400 is to determine if there is a small delta (441). A delta may refer to the number of objects in the original system that are different from objects in the new system. It may be considered a small delta when the number of objects in the original system that need to be upgraded reaches some threshold. While the illustrated method 400 looks for a small delta (441), other indicators could also be used alone or in combination with a delta. For example, an embodiment of the method 400 may also consider the time of day when the upgrade is being performed. As is described herein, the system being upgraded may be unavailable during the initial data migration and also during the final pass. Thus, it may be advantageous to perform the final sweep in relation to time, for example where few people are using and attempting to access the system to be upgraded.

If at step 441 it is determined that there is not a small delta, then the method 400 returns to step 433 where it repeats the above described steps. At step 433 after finding objects and relationships newer then "check date," "check date" is updated to reflect this most recent inquiry, and the method proceeds as described hereinabove. If a small delta is reached the method stops (442). After reaching the small delta, an alternative embodiment of the method 400 performs one or more tasks to finalize the upgrade. According to such an embodiment after reaching a small delta, access is disabled to the system being upgraded and the final remaining data that needs to be upgraded is migrated, transformed where necessary, and written to the N+1 system. Further embodiments may additionally run final acceptance tests, and baseline index processes. For example, prior to making the N+1 system live, automated and/or manual tests may be performed to verify that the N+1 system is in an acceptable state. Further still, embodiments may point clients to the N+1 instance of the system and delete the original instance of the system and the database used to track data transformation.

FIG. 5 is a simplified diagram illustrating the process of transforming data according to an embodiment of the invention. Transformation as referred to herein pertains to the need to handle different data structures in the N and N+1 systems. It is possible that the data represented in the N system is laid out in a manner different from the data in the N+1 system. The transformation may be handled by code referred to as a handler. The handler may group the changes needed for the transformation and produce a transformed set of data.

In FIG. 5 closure 555 represents a closure B in a first system 551 that is to be upgraded. In the illustrated closure 555, the wires, such as the wires X, Y, and Z refer to relationships and the blocked letters, A, B, C, and D refer to objects. The transformation B' 556 is illustrated in the second system 552. In the second system 552 and the respective closure 556, the intermediate object B is removed and B's data is now stored in relationship M. In light of this transformation, the tag database 553 is updated with entry 557 to reflect the changes. In an embodiment of the invention, the grouping of objects involved in the transformation is known as a source closure and the transformed set of objects may be referred to as a target closure.

According to an embodiment of the invention the applications such as the applications 325a-n may register handlers for each object type that requires transformation. Further, in an embodiment of the invention, there may be a default handler for data types that do not require transformation. A default handler may simply return a closure containing a single object. In another embodiment, the handler computes a closure for any object that is modified since the last iteration.

According to an embodiment of the invention, multiple handlers may cooperate in a closure with multiple types. In such a cooperative effort, each handler may produce the same result when any object in the closure changes. For example, if X changes in a given closure, a respective handler will produce B=B,X,Y,Z and similarly if Y changes another respective handler will produce B=B,X,Y,Z. When handlers are cooperating they may be configured to choose and agree on a consistent naming convention for closure identification. In an embodiment of the present invention, the closure identifiers are kept unique and consistent over time. One such possible convention may be to the use the physical identifier of the central object in the closure.

When a particular handler is computing a closure, a graph of the objects and relationships and their respective properties is determined in memory. A possible convention for tracking such transformations may be to use actual physical identifiers (PIDs) when re-using objects/relationship and use symbolic names when generating new objects/relationships.

As described herein, a database, such as a NoSQL database, which may be embodied by the database 327, may be used to record transformations and resulting PIDs. When storing the transformation, according to an embodiment of the invention, the transformation has two parts. An identifier (ID), which is a stable name chosen by the respective handler performing the upgrade, and a PID list, which is a list of actual or symbolic PIDs that make up the transformation. Further, according to an embodiment of the invention, a timestamp may be appended to the ID to indicate the most recent object used in building the closure. Utilizing a timestamp may allow for construction of only one transformation even if multiple objects have changed. Further, according to an embodiment of the invention, if the timestamp is earlier than a stored timestamp it can be assumed that the closure has already been processed.

In addition to storing transformations, an embodiment of the invention may further comprise storing a PID mapping. Using a stored PID mapping may facilitate looking up previous PIDs and deleting corresponding objects where necessary. In such a mapping, when new objects are created new PIDs will be recorded.

FIG. 6 is a high level block diagram of a computer system 601 in which embodiments of the present invention may be embodied. The system 601 contains a bus 615. The bus 615 is a connection between the various components of the system 601. Connected to the bus 615 is an input/output device interface 630 for connecting various input and output devices, such as a keyboard, mouse, display, speakers, etc. to the system 601. A Central Processing Unit (CPU) 605 is connected to the bus 615 and provides for the execution of computer instructions. Memory 625 provides volatile storage for data used for carrying out computer instructions. Storage 620 provides non-volatile storage for software instructions, such as an operating system (OS). The system 601 also comprises a network interface 635 for connecting the system 601 to any variety of networks as is known in the art, such as local area networks (LANs) and wide area networks (WANs).

FIG. 7 illustrates a computer network environment 770 in which the present invention may be implemented. In the computer network environment 770, the server 771 is linked through communications network 772 to clients 773a-n. The environment 770 may be used to allow clients 773a-n, alone or in combination with the server 771, to execute the methods describe above. Further, in an embodiment of the computer network environment 770, the clients 773a-n may access an upgraded system via the network 772 and/or server 771.

It should be understood that the example embodiments described above may be implemented in many different ways. In some instances, the various methods and machines described herein may each be implemented by a physical, virtual, or hybrid general purpose computer, or a computer network environment such as the computer environment 770.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

For example, the foregoing describes first and second systems as any of computer-based, computing, processing, data processing, and database systems, and the like and/or any combinations thereof.

What is claimed is:

1. A method for upgrading a system, the method comprising:
   migrating a copy of data from a first computing system to a communicatively coupled second computing system at a first time during a system upgrade, wherein access to the first computing system is disabled during the migrating at the first time;

at subsequent times during the system upgrade, migrating a copy of changed data, the copy of the changed data being migrated from the first computing system to the second computing system until a threshold is reached, wherein access to the first computing system is enabled and maintained live during the migrating at the subsequent times, wherein the migrating of the copy of the changed data at the subsequent times includes updating corresponding migrated data requiring transformation in data structure by:
- (i) querying the changed data on the live first computing system to determine a subset of the queried changed data requiring transformation in data structure, wherein the subset includes all data on the first computing system requiring transformation in data structure,
- (ii) deleting a subset of the migrated data at the second computing system, the deleted subset of the migrated data at the second computing system corresponding to the determined subset of the queried changed data requiring transformation in data structure at the live first computing system, such that the deleted subset includes all data on the second computing system requiring transformation in data structure,
- (iii) transforming the data structure of the determined subset of the queried changed data at the live first computing system, and
- (iv) migrating a copy of the transformed data from the live first computing system to the second computing system to replace the deleted subset of the migrated data at the second computing system; and in response to reaching the threshold, migrating a copy of remaining changed data from the first computing system to the second computing system, wherein access to the first computing system is disabled during the migrating of the remaining changed data.

2. The method of claim 1 further comprising:
writing a subset of the migrated data to the second computing system in an untransformed manner.

3. The method of claim 1 further comprising:
installing one or more applications in a manner allowing for communication with the second computing system.

4. The method of claim 3 further comprising:
transforming the subset of the migrated data using one or more respective handlers supplied by the one or more installed applications and writing the transformed data to the second computing system.

5. The method of claim 4 wherein the one or more respective handlers utilize a database to track transforming the data.

6. The method of claim 1 wherein the first computing system and the second computing system are communicatively coupled unidirectionally wherein the first computing system has no visibility into the second computing system.

7. The method of claim 1 further comprising:
pointing one or more clients to the second computing system after migrating the copy of the remaining changed data from the first computing system to the second computing system; and
deleting the first computing system after migrating the copy of the remaining changed data from the first computing system to the second computing system.

8. The method of claim 1 further comprising performing kernel upgrades of the second computing system.

9. The method of claim 1 wherein the changed data is data that has been altered and data that has been added to the first computing system since a prior time data was migrated from the first computing system to the second computing system.

10. The method of claim 1 wherein the threshold is an amount of changed data on the first computing system.

11. A computer upgrading system comprising:
a first system;
a second system communicatively coupled to the first system;
a processor configured to:
migrate a copy of data from the first system to the second system, the processor migrating the copy of data at a first time during a system upgrade, wherein access to the first system is disabled during the migration at the first time;
at subsequent times during the system upgrade, migrate a copy of changed data, the processor migrating the copy of the changed data from the first system to the second system until a threshold is reached, wherein access to the first system is enabled and maintained live during the migration at the subsequent times, wherein the migrating of the copy of the changed data at the subsequent times includes updating corresponding migrated data requiring transformation in data structure by:
- (i) querying the changed data on the live first computing system to determine a subset of the queried changed data requiring transformation in data structure, wherein the subset includes all data on the first computing system that requires transformation in data structure,
- (ii) deleting a subset of the migrated data at the second computing system, the deleted subset of the migrated data at the second computing system corresponding to the determined subset of the queried changed data requiring transformation in data structure at the live first computing system, such that the deleted subset includes all data on the second computing system requiring transformation in data structure,
- (iii) transforming the data structure of the determined subset of the queried changed data at the live first computing system, and
- (iv) migrating a copy of the transformed data from the live first computing system to the second computing system to replace the deleted subset of the migrated data at the second computing system; and in response to reaching the threshold, migrate a copy of remaining changed data from the first system to the second system, wherein access to the first system is disabled during the migration of the remaining changed data.

12. The upgrading system of claim 11 wherein the processor is further configured to:
write a subset of the migrated data to the second system in an untransformed manner.

13. The upgrading system of claim 11 wherein the processor is further configured to:
install one or more applications in a manner allowing for communication with the second system.

14. The upgrading system of claim 13 wherein the processor is further configured to:
transform the subset of the migrated data using one or more respective handlers supplied by the one or more installed applications; and
write the transformed data to the second system.

15. The upgrading system of claim 11 wherein the changed data is data that has been altered and data that has been added to the first system since a prior time data was migrated from the first system to the second system.

16. The upgrading system of claim 11 wherein the processor is further configured to:
   point one or more clients to the second system after migrating the copy of the remaining changed data from the first system to the second system; and
   delete the first system after migrating the copy of the remaining changed data from the first system to the second system.

17. The upgrading system of claim 11 wherein the threshold is an amount of changed data on the first system.

18. A computer program product executed by a server in communication across a network with one or more clients, the computer program product comprising:
   a non-transitory computer readable medium, the computer readable medium comprising program instructions which, when executed by a processor causes:
      migrating a copy of data from a first system to a communicatively coupled second system at a first time during a system upgrade, wherein access to the first system is disabled during the migrating at the first time;
      at subsequent times during the system upgrade, migrating a copy of changed data, the copy of the changed data being migrated from the first system to the second system until a threshold is reached, wherein access to the first system is enabled and maintained live during the migrating at the subsequent times, wherein the migrating of the copy of the changed data at the subsequent times includes updating corresponding migrated data requiring transformation in data structure by:
         (i) querying the changed data on the live first computing system to determine a subset of the queried changed data requiring transformation in data structure, wherein the subset includes all data on the first computing system that requires transformation in data structure,
         (ii) deleting a subset of the migrated data at the second computing system, the deleted subset of the migrated data at the second computing system corresponding to the determined subset of the queried changed data requiring transformation in data structure at the live first computing system, such that the deleted subset includes all data on the second computing system requiring transformation in data structure,
         (iii) transforming the data structure of the determined subset of the queried changed data at the live first computing system, and
         (iv) migrating a copy of the transformed data from the live first computing system to the second computing system to replace the deleted subset of the migrated data at the second computing system; and
      in response to reaching the threshold, migrating a copy of remaining changed data from the first system to the second system, wherein access to the first system is disabled during the migrating of the remaining changed data.

* * * * *